No. 777,764.  
Patented December 20, 1904.

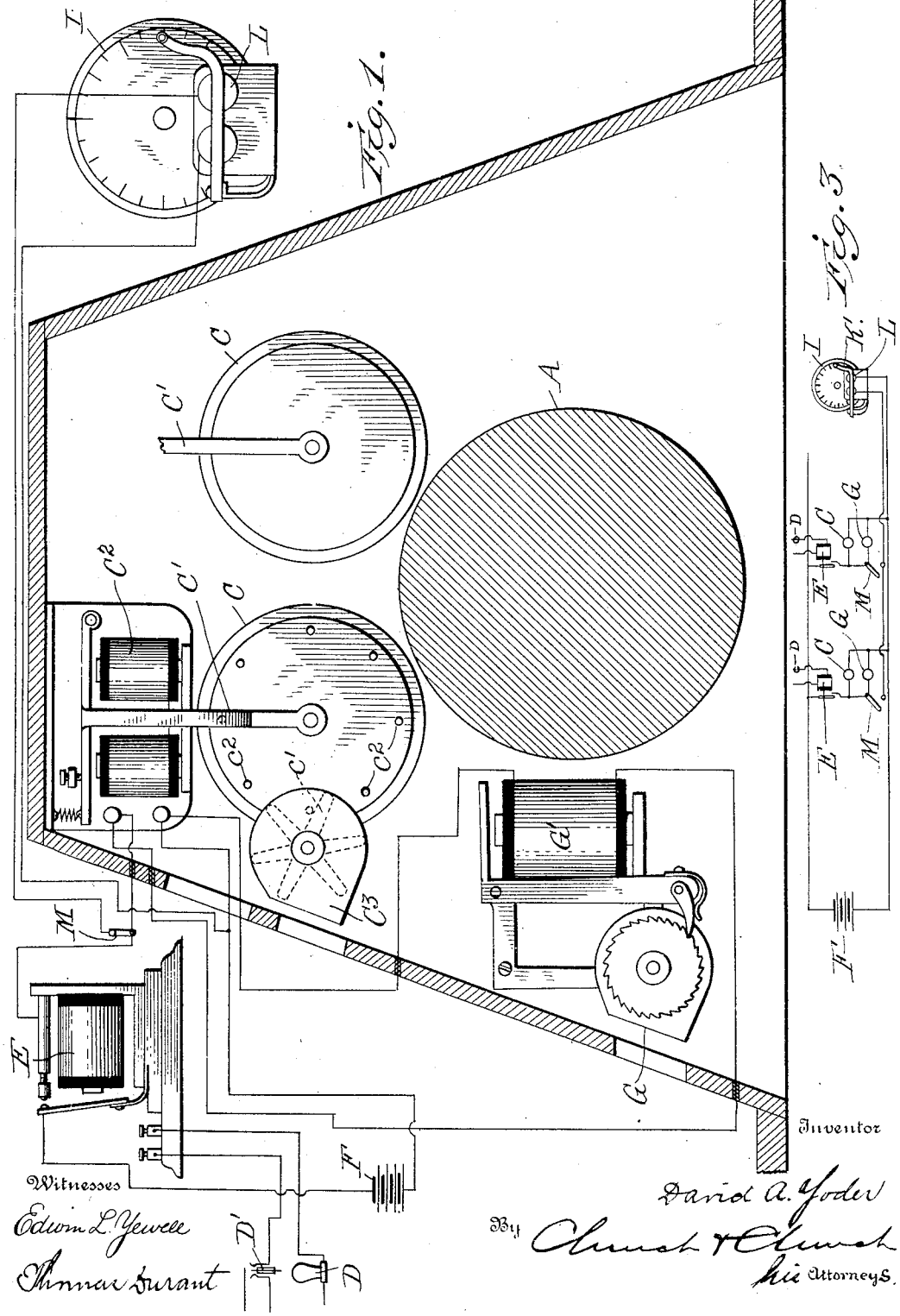

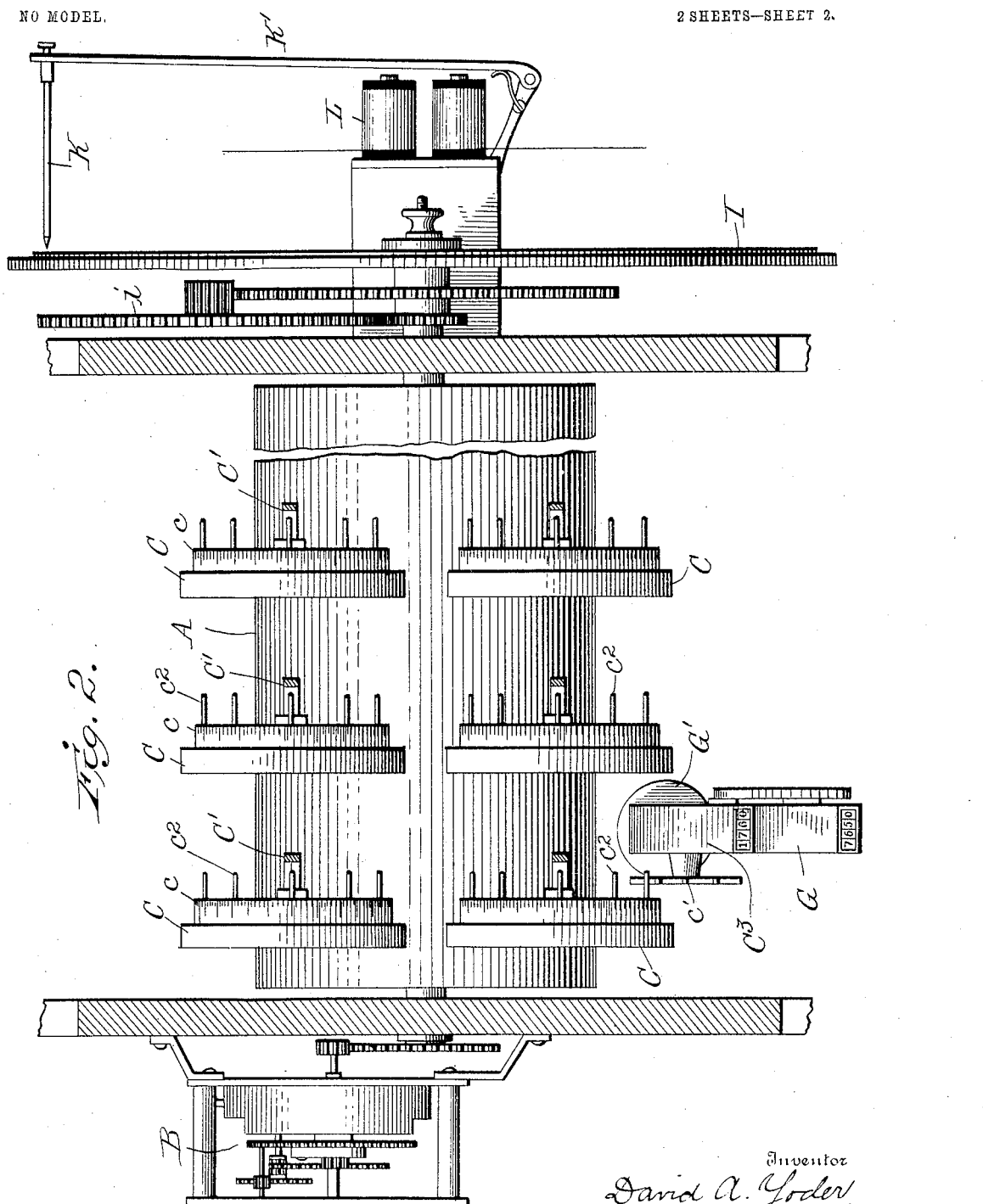

UNITED STATES PATENT OFFICE.

DAVID A. YODER, OF TOLEDO, OHIO.

TELEPHONE-CALL REGISTER AND TIME-INDICATOR.

SPECIFICATION forming part of Letters Patent No. 777,764, dated December 20, 1904.

Application filed April 27, 1904. Serial No. 205,223.

*To all whom it may concern:*

Be it known that I, DAVID A. YODER, a citizen of the United States, residing at Toledo, in the county of Lucas and State of Ohio, have invented certain new and useful Improvements in Telephone-Call Registers and Time-Indicators; and I do hereby declare the following to be a full, clear, and exact description of the same, reference being had to the accompanying drawings, forming a part of this specification, and to the letters of reference marked thereon.

This invention relates to timing and call indicating and recording mechanism, and more especially, though not exclusively, to mechanism of this character for use in connection with telephone-exchanges or exchange systems where it is desired to indicate and record the number of calls, together with the time consumed in the aggregate, for any period of time and, if desired, the individual time of each connection.

The objects of the invention are to provide a simple, accurate, and convenient mechanism for accomplishing the results stated automatically with the consumption of little energy and in such manner that the exchange-operator's record for efficiency is accurately recorded at a point removed from her control, whereby the manager may have the working of an exchange under observation at any or all times, but at a point remote from the switchboard or operators' room.

To the above ends the invention consists in a system embodying a motor mechanism having a definite movement in a given time, a series of time-indicating mechanisms, one for each operator or switchboard-section, each normally inoperative, but controlled in its relation to the motor mechanism by the call-circuit of the switchboard-section to which it relates, whereby the time of all the operators is indicated from the same motor mechanism and the relative efficiency may be accurately determined.

The invention further consists in combining with each operator's call-circuit a counter for indicating the number of calls in that circuit and a recorder for showing the time when the calls are made and also preferably showing the length of time consumed in establishing each connection.

The invention further consists in certain novel details of construction and combinations and arrangements of the mechanism and circuits, all as will be presently described, and pointed out particularly in the appended claims.

Referring to the accompanying drawings, Figure 1 is a vertical section through an apparatus for carrying the present invention into practice, the circuits and portion of the apparatus being shown diagrammatically. Fig. 2 is a plan view of the apparatus shown in Fig. 1 with the casing omitted. Fig. 3 is a diagrammatic illustration of the circuit arrangements.

Like letters of reference in the several figures indicate like parts.

In said drawings the letter A indicates a motor-operated driver, preferably in the form of a relatively long cylinder. Steady motion may be imparted to the driver by any suitable motor mechanism—for instance, a clock-motor mechanism B, Fig. 2—and the peripheral speed of the driver is preferably such as to impart to the time indicating and recording mechanisms a definite time movement whenever said mechanisms are in operative connection therewith.

A series of primary time indicating and registering devices, one for each call or operator's circuit, are provided, each preferably consisting of a disk or wheel C, mounted in a pivoted or movable carrier C', so as to be capable of movement toward and from the driver. The disks and carriers are controlled by electromagnets $C^2$, which when energized will throw the disks into contact with the driver and motion will be imparted to the disks, the extent of such motion being dependent upon the length of time the contact is maintained. As shown in Fig. 2, a portion of the periphery of each disk, as at $c$, is graduated to indicate minute fractions of time, and thus the disks themselves will serve as indicators and registers of the length of time they are in contact with the driver. In the preferred construction, however, an adding device $C^3$ of any well-known construction is provided and adapted to be actuated by the disk to indicate the sum-total of the time. The counters C³ may be actuated from the disk C by any well-known driving mechanism—such, for instance, as the star-wheel $c'$ and pins $c^2$ illustrated.

The magnets C² of each time indicating and registering mechanism are controlled by the operator's or call circuit of one section of a telephone-exchange switchboard, and it will be understood that there is a time indicating and registering mechanism for each section or operator employed on the switchboard, said mechanisms all being arranged in proximity to the driver A and so as to receive their time movements therefrom, as will be understood from an inspection of Fig. 2, where the said mechanisms are shown arranged in two series, one on each side of the driver.

The pilot-light or indicator for a call or operator's circuit of one section of a switchboard is indicated in Fig. 1 at D and the plug at D'. The circuit including the pilot-light also includes a relay E, adapted to be operated each time a call is received by that section of the switchboard.

When the relay E is energized, it closes a local circuit including a generator or battery F and the controlling-magnet C² of the time indicating and registering mechanism, thereby energizing the last-mentioned magnet, and the time indicating and registering mechanism will as a consequence be moved into contact with the driver and be rotated thereby until the pilot-light circuit is plugged out by the operator at the switchboard. The time indicating and registering mechanism will thus serve to indicate and register the time consumed by the operator in making the desired connections for the subscriber, and in order to provide a mechanism for showing the number of calls or connections made by the operator in any given time a counter G for each circuit is provided, said counter being operated by the electromagnet G', and the latter is included in the local circuit with the battery F, but preferably in multiple with the magnet C² of the time indicating and registering mechanism. With this arrangement it will be readily understood that both the number of calls and the time consumed by each operator in making the connections will be accurately tallied and the time indicating and registering mechanism will give the sum-total of the time consumed by the operator in making all of the connections registered by the counter.

Inasmuch as all of the time indicating and registering mechanisms of all of the operators are driven by the same driver or motor, an accurate basis for the comparison of relative efficiencies is assured, and by providing a driver which is maintained in constant motion, the time may be accurately controlled by the provision of a single accurate and powerful time-motor.

In order to make provision for studying any one operator's work in greater detail than is afforded by the time indicating and registering mechanism and counter before described, I preferably provide a recorder with which not only may the number of calls be shown, but the time of day when said calls were made, and in addition the time consumed by the operator in making each connection. This device may be conveniently termed a "monitor," and in the apparatus illustrated it is adapted to be manually switched in with any operator's circuit, so that that operator's work may be more carefully scrutinized and the relative efficiency at different periods of the day or during rush or slack hours ascertained.

As illustrated in the drawings, a relatively large disk I is adapted to be rotated by the driver through intermediate gear $i$, so as to make a single revolution in a relatively long period of time—for instance, to rotate once in twelve or twenty-four hours. The face of this disk I may be graduated in hours, minutes, and seconds, as indicated diagrammatically in Fig. 1, and a marker or pencil K, carried by the arm K', is provided for marking and recording on the disk the time, number, and length of time consumed by the operator in making the connections. The marker is adapted to be operated by a magnet L, which latter is included in the local circuit with the battery F and preferably in multiple with the magnets C² and G'. A switch M is provided for cutting the monitor in or out of circuit, and it will be understood that a switch M is provided for each of the operator's circuits, as shown clearly in the diagrammatic view, Fig. 3, and consequently any one of the operator's circuits may be connected with the monitor at will. The marker will mark on the disk only during the time the pilot-light or equivalent is in operation, and hence the number of marks indicates the number of calls, the length of the marks indicates the time consumed by the operator in making the connections, and the location of the mark on the disk indicates the time of day when the call was made.

In installing the apparatus it will be understood that the whole recording and indicating mechanism may be located in the manager's room and circuits run from each operator's or call circuit to one of the time indicating and recording mechanisms, thus enabling the manager to tell at once whether the operators are making their connections promptly. At the same time by a simple mathematical computation the manager may determine easily and quickly the relative deficiency of the operators and may grade them accordingly. Should persistent complaints be received from a section of the switchboard handled by any one operator, the monitor may be thrown into circuit with that section and will enable the manager to quickly and easily determine whether the complaints are due to the operator's inefficiency or are due to some other cause for which the operator is not responsible.

Having thus described my invention, what I claim as new, and desire to secure by Letters Patent, is—

1. In a call register and indicator, a motor-operated driver, a series of time-indicating mechanisms adapted to be driven thereby, a series of counters, one for each time-indicating mechanism, electromagnets for establishing driving connection between the time-indicating mechanism and driver and a call or operator's circuit controlling each of said magnets; substantially as described.

2. In a call register and indicator a motor-operated driver, a series of time-indicating mechanisms normally out of engagement with but adapted to be driven thereby, electromagnets for establishing the driving connection between the time-indicating mechanisms and driver and a call or operator's circuit for energizing each magnet, said circuit including a call-indicator; substantially as described.

3. In a call register and indicator, a motor-operated driver, a series of time-indicating mechanisms normally out of engagement with but adapted to be driven thereby, electromagnets for establishing the driving connection between the time-indicating mechanism and driver, electromagnetically-operated counters, and call or operators' circuits, each controlling a time indicating and recording mechanism and a counter; substantially as described.

4. In a call register and indicator a motor-operated driver, a series of time-indicating mechanisms adapted to be driven thereby, electromagnets for establishing the driving connection between the time-indicating mechanisms and driver, a corresponding series of counters, local circuits each including one indicator-magnet and one counter, a relay for each circuit, and a call or operator's circuit including each relay; substantially as described.

5. In a call register and indicator a series of telephone call-circuits including call-indicating means, a series of timing mechanisms one for each call-circuit, a constantly-rotated driver and means controlled by each call-circuit for establishing a driving connection between its timing mechanism and the driver; substantially as described.

6. In a call register and indicator a series of telephone call-circuits including call-indicating means, a series of timing mechanisms one for each circuit, a corresponding series of counters for indicating the number of calls, a motor-operated driver for all the timing mechanisms and means controlled by each call-circuit for establishing a driving connection between its timing mechanism and the driver; as set forth.

7. In a call register and indicator, the combination with a series of registers and the time-indicators, a corresponding series of call or operator's circuits for controlling the registers and time-indicators and a monitor adapted to be included in any one of said circuits and embodying a graduated disk, a timing-motor for moving the disk, and an electromagnetically-operated marker coöperating with the disk; substantially as described.

DAVID A. YODER.

Witnesses:
ALEXANDER S. STEWART,
THOMAS DURANT.